US008665895B2

(12) United States Patent
Diab et al.

(10) Patent No.: US 8,665,895 B2
(45) Date of Patent: Mar. 4, 2014

(54) ADVANCED AND DYNAMIC PHYSICAL LAYER DEVICE CAPABILITIES UTILIZING A LINK INTERRUPTION SIGNAL

(75) Inventors: Wael William Diab, San Francisco, CA (US); Scott Powell, Alisa Viejo, CA (US)

(73) Assignee: Broadcom Corporation, Irvine, CA (US)

( * ) Notice: Subject to any disclaimer, the term of this patent is extended or adjusted under 35 U.S.C. 154(b) by 383 days.

(21) Appl. No.: 12/981,875

(22) Filed: Dec. 30, 2010

(65) Prior Publication Data

US 2012/0170591 A1    Jul. 5, 2012

(51) Int. Cl.
*H04L 12/28* (2006.01)

(52) U.S. Cl.
USPC ........... 370/417; 370/389; 370/392; 370/428; 370/466; 370/474

(58) Field of Classification Search
USPC ......... 370/389, 392, 417, 428, 463, 464, 465, 370/466, 471, 473, 474
See application file for complete search history.

(56) References Cited

U.S. PATENT DOCUMENTS

| | | | | | |
|---|---|---|---|---|---|
| 5,459,731 | A * | 10/1995 | Brief et al. | ..................... | 714/704 |
| 6,021,167 | A * | 2/2000 | Wu | ................. | 375/354 |
| 6,046,995 | A * | 4/2000 | Turnbull et al. | ............. | 370/389 |
| 6,052,565 | A * | 4/2000 | Ishikura et al. | ............ | 455/67.11 |
| 6,065,073 | A * | 5/2000 | Booth | .............................. | 710/46 |
| 6,349,331 | B1 * | 2/2002 | Andra et al. | .................. | 709/220 |
| 6,473,442 | B1 * | 10/2002 | Lundsjo et al. | ............... | 370/537 |
| 6,507,591 | B1 * | 1/2003 | Bray | .............................. | 370/501 |
| 6,631,132 | B1 * | 10/2003 | Sourani | .......................... | 370/389 |
| 6,651,107 | B1 * | 11/2003 | Conley et al. | ................. | 709/250 |
| 6,839,345 | B2 * | 1/2005 | Lu et al. | ......................... | 370/365 |
| 6,961,348 | B2 * | 11/2005 | Yu | ................................... | 370/466 |
| 7,031,341 | B2 * | 4/2006 | Yu | ................................... | 370/469 |
| 7,039,690 | B2 * | 5/2006 | Bullman et al. | .............. | 709/220 |
| 7,499,417 | B2 * | 3/2009 | Kim et al. | ...................... | 370/310 |
| 7,782,872 | B2 * | 8/2010 | Rinne | ...................... | 370/395.43 |
| 7,784,076 | B2 * | 8/2010 | Demircin et al. | ............... | 725/81 |
| 8,098,667 | B2 * | 1/2012 | Julian et al. | ................. | 370/395.4 |
| 2002/0037000 | A1 * | 3/2002 | Park et al. | ...................... | 370/349 |
| 2002/0078247 | A1 * | 6/2002 | Lu et al. | ......................... | 709/251 |
| 2002/0078249 | A1 * | 6/2002 | Lu et al. | ......................... | 709/310 |
| 2002/0083231 | A1 * | 6/2002 | Chiang | .......................... | 710/16 |
| 2003/0086391 | A1 * | 5/2003 | Terry et al. | ..................... | 370/329 |
| 2004/0234000 | A1 * | 11/2004 | Page | .............................. | 375/259 |
| 2005/0078683 | A1 * | 4/2005 | Page | .......................... | 370/395.5 |
| 2005/0105499 | A1 * | 5/2005 | Shinozaki et al. | ............ | 370/338 |
| 2005/0195821 | A1 * | 9/2005 | Yun et al. | ....................... | 370/392 |
| 2005/0198082 | A1 * | 9/2005 | Balachandran et al. | ...... | 707/203 |
| 2006/0153307 | A1 * | 7/2006 | Brown et al. | ................. | 375/257 |
| 2007/0060142 | A1 * | 3/2007 | Reznik et al. | ................. | 455/445 |
| 2007/0153683 | A1 * | 7/2007 | McAlpine | ..................... | 370/229 |
| 2008/0232290 | A1 * | 9/2008 | Elzur et al. | .................... | 370/311 |
| 2009/0073884 | A1 * | 3/2009 | Kodama et al. | ................ | 370/235 |
| 2009/0109866 | A1 * | 4/2009 | Kim et al. | ...................... | 370/252 |
| 2009/0225773 | A1 * | 9/2009 | Winter | .......................... | 370/437 |
| 2009/0327782 | A1 * | 12/2009 | Ballou et al. | .................. | 713/330 |
| 2010/0118753 | A1 * | 5/2010 | Mandin et al. | ................. | 370/311 |
| 2010/0235465 | A1 * | 9/2010 | Thorpe et al. | .................. | 709/217 |
| 2010/0262848 | A1 * | 10/2010 | Bobrek et al. | ................. | 713/320 |
| 2010/0332615 | A1 * | 12/2010 | Short et al. | .................... | 709/217 |
| 2012/0147936 | A1 * | 6/2012 | Rangan et al. | ................ | 375/222 |

* cited by examiner

*Primary Examiner* — Andrew Lai
*Assistant Examiner* — Andrew C Lee
(74) *Attorney, Agent, or Firm* — Duane S. Kobayashi

(57) ABSTRACT

Advanced and dynamic physical layer device capabilities utilizing a link interruption signal. The physical layer device can use a link interruption signal to signal to a media access controller device that the link has temporarily been interrupted. This link interruption signal can be generated in response to one or more programmable modes of the physical layer device that are used to support the advanced and dynamic physical layer device capabilities.

11 Claims, 4 Drawing Sheets

ADVANCED AND DYNAMIC PHYSICAL LAYER DEVICE CAPABILITIES UTILIZING A LINK INTERRUPTION SIGNAL

BACKGROUND

1. Field of the Invention

The present invention relates generally to Ethernet systems and, more particularly, to advanced and dynamic physical layer device capabilities utilizing a link interruption signal.

2. Introduction

Ethernet is a network communication standard that is used widely in communicating information between computers and other electronic devices. On example of such a network communication standard is 10GBASE-T, which allows 10 gigabit/second connections over unshielded or shielded twisted pair cables, over distances up to 100 meters.

FIG. 1 illustrates an example end-to-end link environment in which 10GBASE-T can be applied. As illustrated, server 110 is coupled to switch 120 by a link supported by physical layer devices (PHYs) 112, 122. As would be appreciated, a controller such as that within server 110 can generally be part of a client (e.g., laptop, desktop or workstation), a server (e.g., audio-video (AV) server, high performance computing (HPC) server), or a consumer edge device (e.g., HDTV, Blu-eray, etc.). Further, switch 120 can represent a router or any other device that incorporates multi-port switch functionality. In various examples, the switch can be a consumer, SMB, enterprise, metro, or access switch. In another example, the switch can represent a voice over IP (VoIP) chip that has a network interface (Port 0) and a PC interface (Port 1). In yet another example, the switch can represent a customer premise equipment (CPE) device in a service provider access network that can have an optical central office (CO) facing interface (Port 0) and multiple interfaces (Ports 1-N) that are facing the home and/or gateway (e.g., the CPE can simply be a media converter and/or part of the home gateway). Still further, the switch can represent an access point such as a WLAN base station.

As is further illustrated in FIG. 1, PHYs 112 and 122 interface with media access controllers (MACs) 114 and 124, respectively. After a link is established, PHYs 112, 122 can be configured to perform various actions that can potentially impact the status of the established link as seen by MACs 114, 124. Examples of these various actions include dynamically changing a speed of a link, performing link retransmission, link retraining, etc. In this environment, what is needed is a mechanism that enables PHYs to perform the various advanced and dynamic actions without adversely affecting the link status as seen by the MACs to which the PHYs are connected.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which.

SUMMARY

Figure 1:
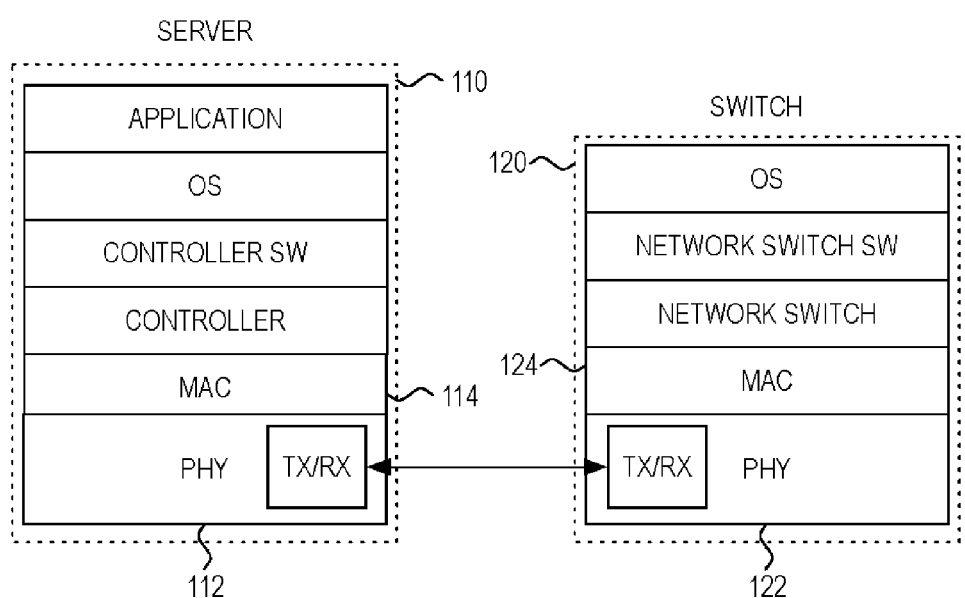
FIG. 1 illustrates an example of an end-to-end link.

Advanced and dynamic physical layer device capabilities utilizing a link interruption signal, substantially as shown in and/or described in connection with at least one of the figures, as set forth more completely in the claims.

DETAILED DESCRIPTION

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

As noted, PHYs can be configured to perform various dynamic actions that can potentially impact the status of the established link as seen by the MACs to which the PHYs are coupled. To illustrate this potential impact, consider the example of PHYs that dynamically change a speed of a link. For example, after a 10 G link is established through autonegotiation, the 10 G PHYs and/or the link partners that contain them could determine that the speed of the link should be lowered. In one example, the speed of the link can be lowered from 10 G to 1 G, or another standard speed. In another example, the speed of the link can be lowered from 100 to a non-standard speed such as 50 or 2.5 G. Here, it should be noted that change in speed of the link can be applied asymmetrically in one direction (e.g., applied asymmetrically where the link is 10 G down and 1 G up for EthernetHD on a high definition TV set). In general, the TX and RX speeds need not be the same as the speed of the link can be responsive to conditions that have different effects in different directions of the link.

In general, the change in link rate could occur for variety of reasons, including power savings initiatives (e.g., subset PHY, low power idle), bit error rates (BER), cable diagnostics, traffic congestion, or other performance degradation factors. For example, a 10 G link that is initially established for high definition video transmission could experience performance degradation due to a low-grade communication channel (e.g., a link that is outfitted with low-grade cabling that does not support 10 G transmission).

Conventionally, a change in link rate would result in a hard link down event such as a link restart, thereby resulting in frames being dropped by the MAC while the PHYs are reconfigured to support the new link speed. In one example, this reconfiguration process can take seconds as the link is restarted, a process that can trigger upper layer protocols (e.g., 802.1 protocols). Thus, from the MACs perspective, the change in link rate by the PHY would adversely affect the status of the link as seen by the MACs. As would be appreciated, any change in the link rate (up or down) would result in an interruption of the link.

It is a feature of the present invention, that a link interruption signal can be transmitted by the PHY to the MAC to facilitate a dynamic change being effected by the PHY. To illustrate this feature of the present invention, reference is now made to FIG. 2, which illustrates the use of such a link interruption signal in the MAC/PHY interface.

Figure 2:
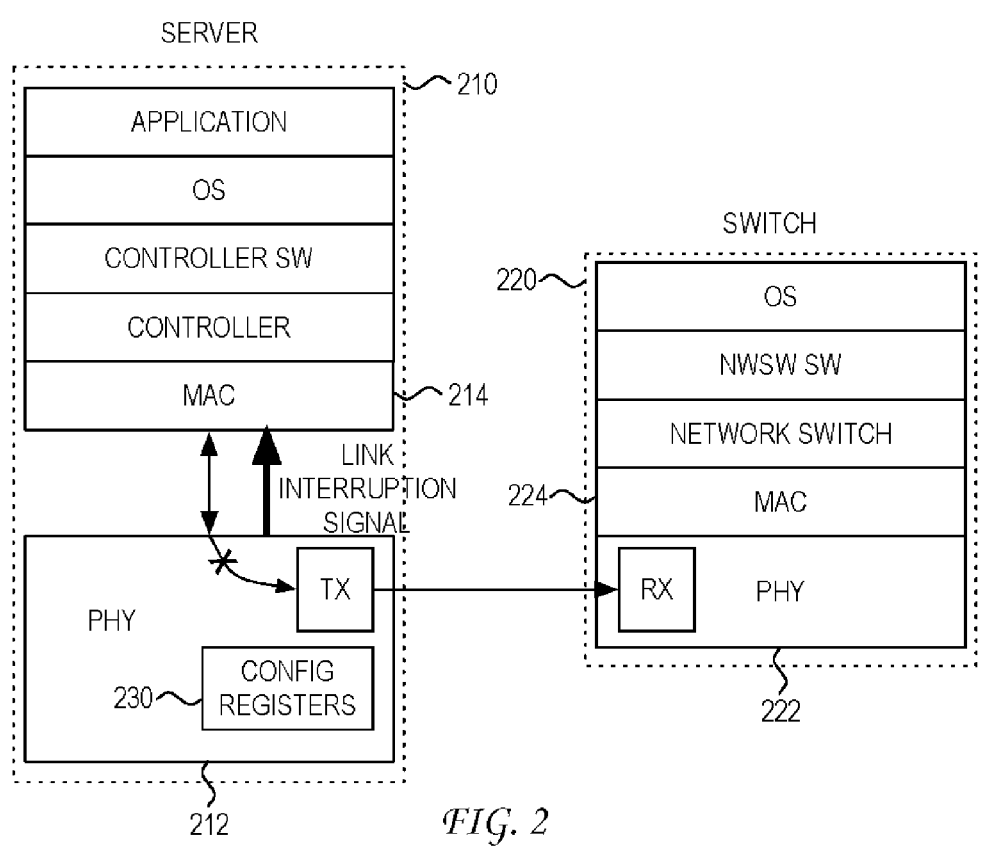
FIG. 2 illustrates an example of a link interruption signal used to facilitate a dynamic change effected by a physical layer device.

As illustrated in FIG. 2, only a single direction of a full duplex link is shown where a transmitter (TX) in PHY 212 in server 210 transmits traffic to a receiver (RX) in PHY 222 in switch 220. As would be appreciated, the principles of the present invention can be applied to both directions of the link. In the example of FIG. 2, PHY 212 interfaces with MAC 214.

In response to a condition that produces a need to dynamically change a link speed, PHY 212 generates a link interruption signal, which is passed to MAC 214 via the MAC/PHY interface. In one embodiment, this link interruption signal is designed to signal that a link interruption condition has occurred and that deference to such a link interruption condition can occur. Here, the assertion of the link interruption signal to the MAC can cause the MAC to hold off transmission of frames to the PHY in deference to the link interruption condition being reported by the PHY.

In one embodiment, holding off of the transmission of frames by the MAC would be accomplished through the buffering of frames (e.g., in transmit queue). As would be appreciated, the specific location of the buffering in the device layers above the PHY would be implementation dependent. Of significance is that the buffering of the frames by the higher layers enables the MAC to maintain a status of the link that does not require the triggering of link restart protocols by the upper protocol layers. Rather, the buffering of the frames by the higher layers is a temporary response to a temporary link interruption as reported by the PHY through the link interruption signal. As the MAC is made aware of the temporary link interruption condition, such link interruption condition can be indicated to the user.

In one embodiment, the link interruption signal is conveyed in-band with the data to allow for lower latency. In another embodiment, the link interruption signal is conveyed through an out-of-band signal (e.g., external signal).

It should be noted that the link interruption signal need not precisely indicate the source or reason for the generation of the link interruption. This generic signaling is significant in that it facilitates various advanced and dynamic PHY capabilities. In one embodiment, the generic nature of the link interruption condition is facilitated by configuration register 230.

In one embodiment, configuration register 230 enables programmability in PHY 212 through a specification of one or more modes or combination of modes in PHY 212 that will trigger the production of a link interruption signal. This programmability of PHY 212 using configuration register 230 enables PHY 212 to determine when to alert MAC 214 that a link interruption condition has occurred. Here, the specific one or more modes or combination of modes in PHY 212 would be supported by the halting of the transmission of frames by MAC 214 to PHY 212. In effect, the programmability of PHY 212 using configuration registers 230 would enable the coordination of MAC 214 to the advanced and dynamic capabilities of PHY 212 without requiring implementation-specific signaling to be defined between MAC 214 and PHY 212.

Figure 3:
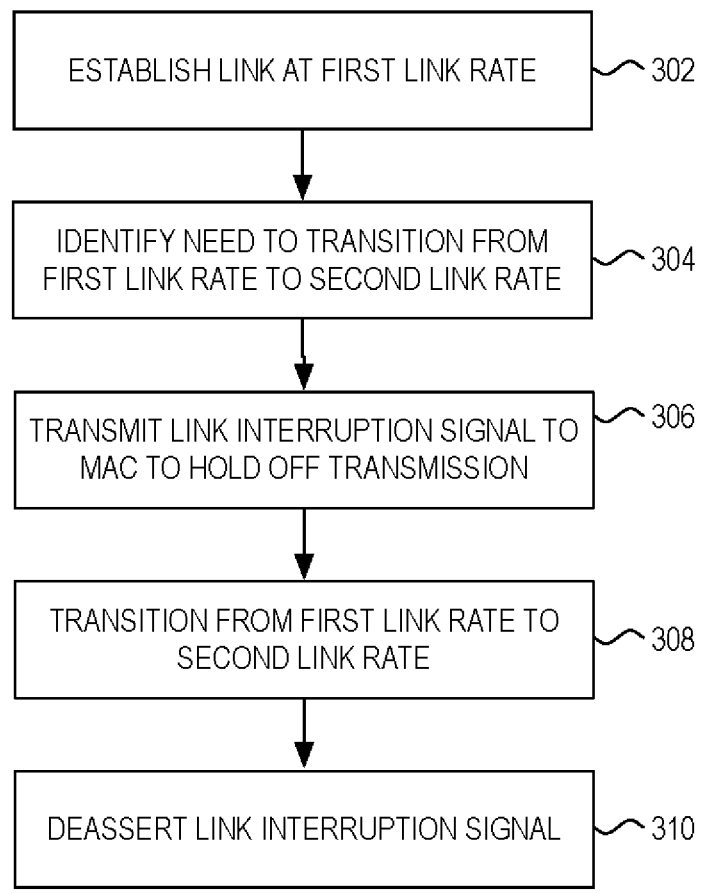
FIG. 3 illustrates a flowchart of a link rate transition process of the present invention.

To further illustrate the use of a link interruption signal in accommodating dynamic changes in link speed by the PHY, reference is now made to the flowchart of FIG. 3. As illustrated, the process begins at step 302, where a link is established between a local PHY and a remote PHY. As would be appreciated, the established link rate can be identified using autonegotiation in identifying the highest common operating mode supported by the local and remote PHYs.

Next, at step 304, a need to transition from the first link rate to a second link rate different from the first link rate is identified. As noted, the basis for such a dynamic change in link rate can be based on various factors such as a power savings initiative, BER, cable diagnostics, or other performance factors. To facilitate such a dynamic change in link rate a link interruption signal is transmitted from the PHY to the MAC at step 306. In one embodiment, the mode of the PHY that is associated with the transition in link rate would trigger the generation of the link interruption signal. This triggering is based on the programmability effected by the configuration register(s).

The receipt of such a link interruption signal by the MAC is an indication that a link interruption condition has occurred at the PHY. The presence of such a link interruption condition at the PHY would cause the MAC to hold off of the transmission of frames to the MAC.

During the time that the MAC holds off of transmission of frames to the PHY, the PHY can then transition, at step 308, from the first link rate to the second link rate without the risk of frames being dropped. Once the transition of link rate has completed, the PHY can then deassert the link interruption signal at step 310.

Figure 4:
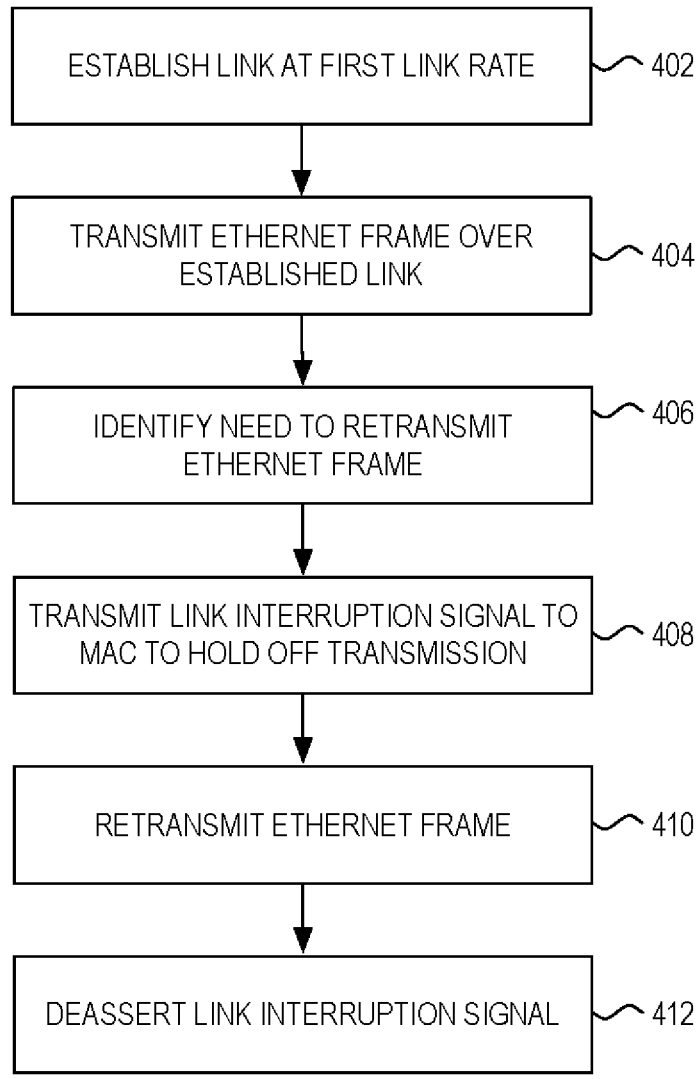
FIG. 4 illustrates a flowchart of a frame retransmission process of the present invention.

To further illustrate the use of a link interruption signal in accommodating other advanced and dynamic capabilities of the PHY, reference is now made to the flowchart of FIG. 4, which illustrates an application to frame retransmission. As illustrated, the process begins at step 402, where a link is established between a local PHY and a remote PHY. After the link is established, an Ethernet frame is transmitted over the established Ethernet link. Next, at step 406, a need to retransmit the Ethernet frame is identified. As would be appreciated, the need for retransmission of the Ethernet frame can be based on various conditions that can produce an error in the first transmission.

To facilitate such an Ethernet frame retransmission a link interruption signal is transmitted from the PHY to the MAC at step 408. In one embodiment, the frame retransmission mode of the PHY would trigger the generation of the link interruption signal. Again, this triggering is based on the programmability effected by the configuration register(s).

The receipt of such a link interruption signal by the MAC is an indication that a link interruption condition due to frame retransmission has occurred at the PHY. The presence of such a link interruption condition at the PHY would cause the MAC to hold off of the further transmission of frames to the MAC.

During the time that the MAC holds off of transmission of frames to the PHY, the PHY can then retransmit the Ethernet frame at step 410. In conventional processes, buffering in the PHY is used to support the frame retransmissions. In the present invention, the link interruption signaling enables the PHY to repurpose the buffering that was originally used to support frame retransmissions. In one embodiment, the holding off of the MAC using the link interruption signal can obviate the need to include as much buffering as would conventional implementations. Finally, once the frame retransmission has completed, the PHY can then deassert the link interruption signal at step 412.

As would be appreciated, various other advanced and dynamic PHY capabilities can be supported by the use of a link interruption signal. In another application, the link interruption signal can be used to support retraining of a PHY when it awakens from a low power state. Here, the transition from a low power state to an active state could result in error, even when refresh signal were used during the low power state. In this scenario, the link interruption signal can be used to hold off the MAC during retraining of the PHYs, thereby preserving the link from a restart condition. As would be appreciated, retraining of the PHYs can include updating precoder coefficients and then appropriately adjusting synchronization and other filters (e.g., echo, NEXT, FEXT, equalizers, etc.). The use of a link interruption signal in this context is especially valuable when considering the frequency at which a PHY can transition from a low power state to an active state.

As has been described, prevention of a dropped link or lost data is based on signaling by the PHY to the MAC that a link interruption condition has occurred. In the present invention, the link interruption signaling is a generic indication of a condition that can be triggered by one or more programmable modes in the PHY.

It should be noted that the usage of link interruption signaling enables the PHY to leverage available buffering in the MAC or higher layers. While this does not preclude buffering from also being included in the PHY, the leveraging of the available buffering in the MAC or higher layers supplements the limited buffering or absence of buffering in the PHY. This reduces the potential costs of implementation in PHYs that support advanced and dynamic capabilities.

Further, the principles of the present invention can be applied to various PHY types (e.g., backplane, twisted pair, optical, etc.), standard or non-standard (e.g., 2.5 G, 5 G, 10 G, 40 G, 100 G, etc.) link rates, future link rates (e.g., 400 G, 1000 G, etc.), as well as applications (e.g., DSL, PON, wireless, etc.).

These and other aspects of the present invention will become apparent to those skilled in the art by a review of the preceding detailed description. Although a number of salient features of the present invention have been described above, the invention is capable of other embodiments and of being practiced and carried out in various ways that would be apparent to one of ordinary skill in the art after reading the disclosed invention, therefore the above description should not be considered to be exclusive of these other embodiments. Also, it is to be understood that the phraseology and terminology employed herein are for the purposes of description and should not be regarded as limiting.

What is claimed is:

1. A method for frame retransmission in a physical layer device, comprising:
    establishing a link between a local physical layer device and a remote physical layer device, said local physical layer device and said remote physical layer device being coupled via a network cable;
    transmitting an Ethernet frame over said established link to said remote physical layer device;
    identifying a need to retransmit said Ethernet frame to said remote physical layer device
    transmitting a link interruption signal from said local physical layer device to a local media access control coupled to said local physical layer device, said transmitted link interruption signal alerting said local media access control to hold off transmission to said local physical layer device,
    retransmitting said Ethernet frame to said remote physical layer device while said local media access control is holding off transmission based on said transmitted link interruption signal; and
    after said retransmission is complete, de-asserting, by said local physical layer device, said link interruption signal, said de-asserting enabling said local media access control to resume transmission to said local physical layer device.

2. The method of claim 1, wherein said transmitting comprises transmitting an in-band signal with data.

3. The method of claim 1, wherein said transmitting comprises transmitting an out-of-band signal.

4. The method of claim 1, wherein said local physical layer device does not include buffering.

5. The method of claim 1, further comprising buffering traffic in a transmit queue during said retransmitting.

6. A link retrain method in a physical layer device, comprising:
    establishing a link between a local physical layer device and a remote physical layer device, said local physical layer device and said remote physical layer device being coupled via a network cable, wherein said local physical layer device and said remote physical layer device each include both an active state and a low power state;
    from said low power state, transitioning, by said local physical layer device, to said active state;
    if it is determined that retraining between said local physical layer device and said remote physical layer device is needed, then transmitting a link interruption signal from said local physical layer device to a local media access control device coupled to said local physical layer device, said transmitted link interruption signal alerting said local media access control device to hold off transmission to said local physical layer device;
    performing, by said local physical layer device, a retrain process with said remote physical layer device while said local media access control device is holding off transmission based on said transmitted link interruption signal; and
    after said retraining is complete, de-asserting, by said local physical layer device, said link interruption signal, said de-asserting enabling said local media access control device to resume transmission to said local physical layer device.

7. The method of claim 6, wherein said transmitting comprises transmitting an in-band signal with data.

8. The method of claim 6, wherein said transmitting comprises transmitting an out-of-band signal.

9. The method of claim 6, further comprising buffering traffic in a transmit queue during said retransmitting.

10. The method of claim 6, wherein said low power state is a low power idle state.

11. The method of claim 6, wherein said low power state is a subset physical layer device state.

* * * * *